Patented Apr. 7, 1942

2,278,957

UNITED STATES PATENT OFFICE 2,278,957

WHITE LIGHTWEIGHT AGGREGATE

John Walker and William Ungerleider, Easton, Pa.

No Drawing. Application May 17, 1939, Serial No. 274,282

4 Claims. (Cl. 106—71)

Our invention relates generally to white lightweight aggregate material, and in particular to material of this character adapted for use in conjunction with hydraulic, Portland, stucco, and various other inorganic fast-setting cements used in the making of concrete structures, masonry units, interior and exterior surfaces, ornamental objects, and the like; and also adapted for use in conjunction with phenol, synthetic resin, casein, and other so-called plastics as a hard, porous, white filler of high strength, and an important object of our invention is to provide a material of the character indicated which exhibits substantially the following characteristics:

(1) A pure white color capable of being changed from the original white to other light colors.

(2) Lightness in weight varying from 30 pounds per cubic foot to 60 pounds per cubic foot, the variation being controllable.

(3) High porosity with controllable variation from 30% natural fired porosity to 80%.

(4) High compressive strength and hardness as compared with calcined kaolin, the strength and hardness being subject to controllable variation.

(5) Fire resistance when combined with inorganic binders.

(6) Incombustibility and fireproofness.

(7) High resistance to heat transfer as compared to ordinary masonry material, this characteristic being controllable as to variation.

(8) Sound absorbency and acoustical characteristics superior to other masonry, with controllable variation.

(9) Chemical inertness and stability.

Other important objects and advantages of our invention will be apparent from a reading of the following description taken in connection with the examples given herein for illustrative purposes.

The main aspect of the present invention is the production of white colored concrete products by providing for the formation thereof, of a pure white aggregate of exceptional characteristics as herein outlined and using the same with a white binder material such as lime, white Portland cement, white magnesia cement, and the like.

A similarly important aspect of the present invention is the production of white colored organic plastic products by providing for the formation thereof, of a pure white aggregate of exceptional characteristics as herein outlined, and using with the same white or colorless organic plastic material.

It is expressly intended that the present invention be not limited to either of the aspects in white color, since bright shades or tints can be readily developed from the basic white color, where such variations are desired.

The ingredients composing the present invention comprise white burning clays and kaolins, flint kaolins, finely divided organic combustible filler or fiber or free burning liquid hydrocarbon, carbonates or oxides of calcium, magnesium, sodium, boron, and other base forming metals. These base forming materials are contrasted with the components of present light-weight aggregates of commercial importance which components are calcined diatomaceous earth, cinders, pumicite treated to increase its strength, calcined kaolin filled with voids, rock sponge, shale calcined to considerable porosity, and various forms of expanded mica and the like.

The kaolins employed in the present invention exhibit the following typical analyses:

*Flint kaolin*

| | |
|---|---|
| Moisture at 100° C | 2.70 |
| Loss on ignition | 10.94 |
| $Na_2O$ | .05 |
| $K_2O$ | .06 |
| MgO | Trace |
| $Al_2O_3$ | 28.36 |
| $Fe_2O_3$ | 1.57 |
| $TiO_2$ | 2.07 |
| $SO_3$ | Trace |
| $P_2O_5$ | Trace |
| $SiO_2$ | 54.28 |

*Hard kaolin*

| | |
|---|---|
| Moisture at 100° C | 1.44 |
| Loss on ignition | 14.08 |
| $Na_2O$ | Trace |
| $K_2O$ | Trace |
| CaO | 1.44 |
| MgO | Trace |
| $Al_2O_3$ | 37.44 |
| $Fe_2O_3$ | 2.19 |
| $TiO_2$ | 1.35 |
| $SO_3$ | .38 |
| $P_2O_5$ | .15 |
| $SiO_2$ | 41.50 |

The kaolin and flint kaolin when mixed in dry pulverized form in proportions of one part by weight of kaolin, one part by weight of flint kaolin, and when fired to a temperature ranging between 1200° C. to 1400° C., depending upon the variation in characteristics of the raw materials, react in a specific thermodynamic manner to produce a homogeneous material that is white, porous, very hard, and light in weight. It is important to have it understood in connection with the present disclosure that the kaolin burns white, porous, and light weight at the stated range of temperature but not hard. On the other hand the flint kaolin burns very hard, porous and light weight at this range of temperatures, but not white.

The introduction of the combustible organic substance serves to provide voids in the homogeneous material thereby increasing the porosity to a controllable degree.

The purpose of the mentioned oxides and/or carbonates of the metallic elements is to provide a surface on the particles which will bond well with cement. The metallic oxides may be incorporated in the wood fiber or other organic combustible material used to provide voids that are sealed on the interior.

The present invention comprises the aspect also of so processing this filler material that its characteristics of weight per cubic foot, compressive strength per square inch, porosity, sound absorptive characteristics and thermal insulation characteristics may be varied within relatively wide limits according to the use to which it is to be put.

A typical example of the present invention comprises the following ingredients in substantially the proportions stated:

| | Pounds |
|---|---|
| Kaolin | 40 |
| Flint kaolin | 40 |
| Spruce wood fiber, finely divided, 40 mesh | 20 |

The resultant of the foregoing is placed in a pug mill with sufficient water to make a stiff mud suitable for extrusion through dies of various sizes, ½ inch die being more or less standard.

The extruded material is covered with a fine dust of calcined kaolin, cut into lengths of about ½ inch and fired in a kiln, rotary or other suitable type, to a time temperature treatment of cone 8, cooled and crushed to a desired particle size, and then mixed with white Portland cement and water in the proportion of one part of the cement to five parts of the aggregate, and then molded in a cinder block machine under pressure and dried, or processed by any other method or methods in general use.

When this resultant is set, the concerete is hard, pure white in color, and has a compressive strength varying between 400 and 800 pounds, depending on the variable characteristics of the raw materials. A much stronger and denser concrete is obtained when no organic combustible material is used in the fired aggregate. Compressive strengths of from 1000 or 2000 pounds per square inch can be obtained by increasing the proportion of cement to the aggregate. Less sound absorbent and less porous concrete can be obtained by extending the amount of cement up to within 10% by weight of the kaolin.

If desired, sealed voids may be produced in the material by incorporating any one of a number of fluxes in the organic combustible material, fusion taking place between individual fibres of organic material bearing flux and a thin envelop of koalin mixture immediately surrounding the fibre. Although the proportion of flux to the entire kaolin mixture is so small, there is no possibility of more than local fusion taking place at this temperature of between 1760° and 3200° F.

It is to be observed that the purpose of the introduction of the combustible organic material is to provide voids in the homogeneous resultant material and thereby increase the porosity thereof. The purpose of the utilization of the oxides and/or carbonates of the metallic elements is to provide a surface on the particles of the aggregate which will bond well with cement. It is also to be observed that these metallic oxides and/or carbonates may be incorporated in the wood or other organic combustible material to provide voids which are sealed on the interior, whereby it is possible to obtain a filler of the desired characteristics of weight, compressive strength, porosity, sound absorptiveness and thermal insulation characteristics, all of these being capable of being varied within relatively wide ranges to suit the particular use.

By way of recapitulation the process of the present invention involves the mixing together of the dried kaolin and dried flint kaolin with or without combustible organic fibers and fillers and with and without oxides and/or carbonates of the base forming metallic elements, the rendering plastic by the mixing with water in an extrusion press, the coating of the extruded matter with powdered kaolin to prevent agglomeration of particles thereof, the calcining of the particles over a heat range of from cone 3 to 14, but substantially short of a fusing temperature, resulting in an aggregate which is harder than kaolin calcined in a similar manner and the aggregate being whiter than flint kaolin calcined within similar temperature ranges.

For specified uses the material of the present invention is applicable to the following examples:

Formation of a precast masonry block; 3 to 9 parts of aggregate to one part cement made up similarly to a cinder block.

Ornamental concrete: 3 to 9 parts of aggregate to one part of cement, plus cement extender applied as stucco, interior or exterior.

Synthetic ceramic ware: 1 to 6 parts of aggregate to one part of cement.

Plastic filler: 1 to 4 parts of aggregate (finely divided) to one part of organic plaster binder.

Loose insulation fill material: pulverized to suitable mesh (from 40 to 200) combined or uncombined with a suitable fiber such as cotton, and the like.

Acoustical plaster filler: one to three parts of aggregate to one part of cement.

Although we have shown and described herein preferred embodiments of our invention, it is to be definitely understood that we do not desire to limit the application of our invention thereto, and any change or changes may be made in the materials and in the manner of assembling the same, within the spirit of our invention and the scope of the subjoined claims.

Having described the invention, what is claimed as new is:

1. An aggregate comprising the product obtained by calcining a mixture of flint kaolin and white burning kaolin.

2. An aggregate comprising the product obtained by calcining a mixture of flint kaolin and white burning kaolin, and combustible organic material.

3. An aggregate comprising the product obtained by calcining a mixture of flint kaolin and white burning kaolin, and at least one substance selected from the group consisting of the oxide of calcium, magnesium, sodium, and boron.

4. An aggregate comprising the product obtained by calcining a mixture of flint kaolin and white burning kaolin, combustible organic material, and at least one substance selected from the group consisting of oxide of calcium, magnesium, sodium, and boron.

JOHN WALKER.
WILLIAM UNGERLEIDER.